United States Patent
Frith et al.

(10) Patent No.: US 7,402,986 B2
(45) Date of Patent: Jul. 22, 2008

(54) POWER SUPPLY CIRCUIT FOR PORTABLE BATTERY POWERED DEVICE

(75) Inventors: Peter Frith, Edinburgh (GB); David Sinai, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 112 days.

(21) Appl. No.: 11/185,718

(22) Filed: Jul. 21, 2005

(65) Prior Publication Data

US 2006/0022640 A1  Feb. 2, 2006

(30) Foreign Application Priority Data

Jul. 26, 2004  (GB)  ................... 0416631.0
Jul. 13, 2005  (GB)  ................... 0514332.6

(51) Int. Cl.
  *G05F 1/40*  (2006.01)
  *H02J 1/00*  (2006.01)
(52) U.S. Cl. ........................ 323/282; 307/86
(58) Field of Classification Search ......... 323/266–273, 323/282; 307/52, 61, 63, 64, 66, 71–75, 307/77, 80, 85, 86; 363/142
See application file for complete search history.

(56) References Cited

U.S. PATENT DOCUMENTS

| 5,144,222 | A | | 9/1992 | Herbert |
| 5,793,184 | A | * | 8/1998 | O'Connor ................. 320/101 |
| 5,895,982 | A | | 4/1999 | Eng |
| 6,163,086 | A | * | 12/2000 | Choo ........................ 307/43 |
| 6,348,744 | B1 | * | 2/2002 | Levesque ................... 307/86 |
| 6,459,171 | B1 | | 10/2002 | Leifer |
| 6,751,109 | B2 | * | 6/2004 | Doss et al. ................. 363/142 |
| 7,047,431 | B2 | * | 5/2006 | Suzuki ..................... 713/340 |
| 2004/0075418 | A1 | | 4/2004 | Densham et al. |

FOREIGN PATENT DOCUMENTS

| EP | 0 316 781 A1 | 5/1989 |
| EP | 1 521 344 A1 | 4/2005 |
| GB | 1440240 A | 6/1976 |
| GB | 2 322 486 A | 8/1998 |
| WO | WO-03/036979 A1 | 5/2003 |

* cited by examiner

*Primary Examiner*—Matthew V Nguyen
(74) *Attorney, Agent, or Firm*—Dickstein Shapiro LLP

(57) ABSTRACT

The present invention relates to battery power peripheral devices such as MP3 players which are also periodically connected to another power source such as a mains wall socket or USB cable power bus. In particular, but not exclusively, the present invention relates to regulation of these voltage sources. In general terms the present invention provides a multiple supply rail for the load regulators of a power supply circuit for a battery powered device. One supply rail is coupled to the battery, and another is coupled to a non-battery source such as an external mains regulated source and/or a bus power wire from a USB cable or similar. The regulators have multiple inputs, each for taking their input voltage from one of these supply rails.

23 Claims, 12 Drawing Sheets

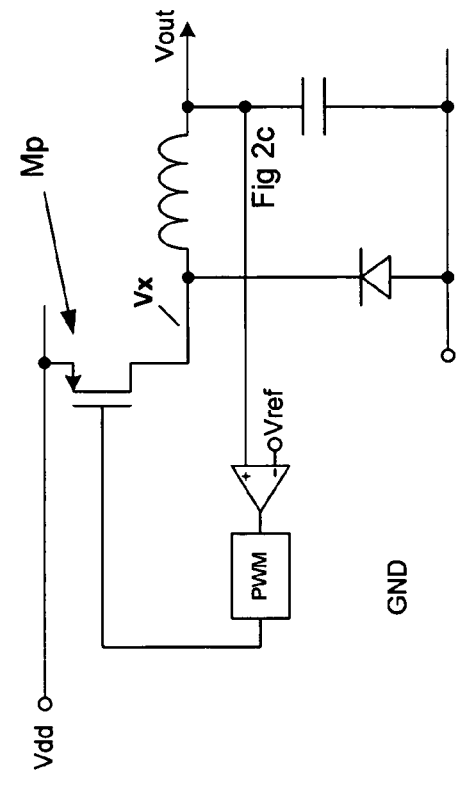
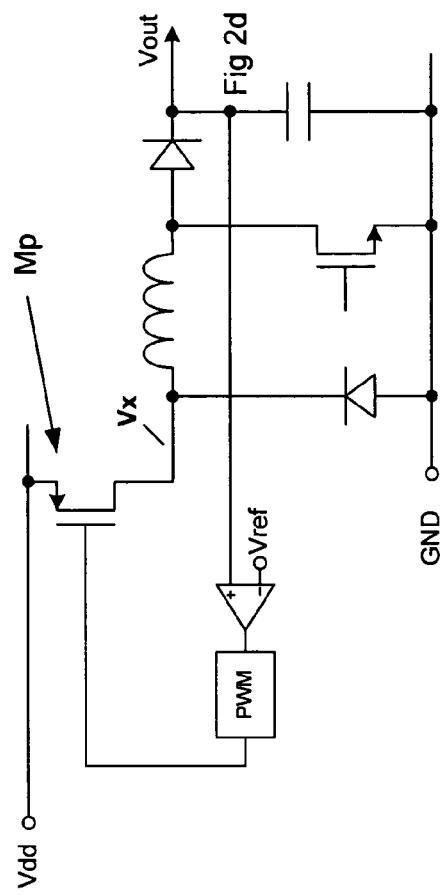
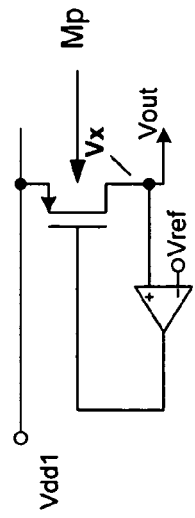
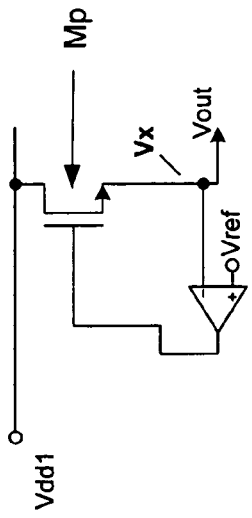
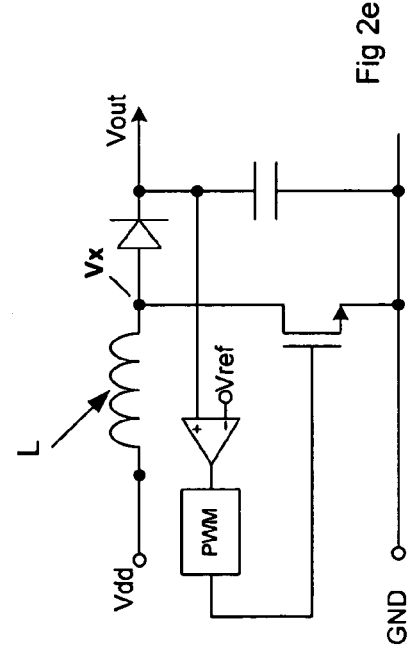

POWER SUPPLY CIRCUIT FOR PORTABLE BATTERY POWERED DEVICE

FIELD OF THE INVENTION

The present invention relates to portable battery powered peripheral devices such as MP3 players or cell-phones which are also periodically connected to another power source such as a mains wall socket or USB cable power bus. In particular, but not exclusively, the present invention relates to regulation of these voltage sources.

BACKGROUND OF THE INVENTION

FIG. 1a shows a power supply system for a typical battery-powered peripheral device.

The system comprises connections 11 and 13 to external power supplies, as well as to a re-chargeable battery 10. The external supplies are typically regulated (12) and/or switched to a common external supply node (Vsup) which supplies charging current to the battery through a charging circuit or controller 14. The battery 10 is coupled to an internal power bus which supplies one or more load regulators 15 which provide regulated voltage outputs to one or more parts of the peripheral device. For example one load regulator 15a may supply the disk drive of an MP3 player, whilst another regulator 15b supplies its signal processing and amplifier circuitry.

The battery 10 can be recharged from the power wires 11 in a bus cable, such as a USB or IEEE 1394 connection. Supply current taken from the bus power wires 11 will generally first pass through a supply bus regulation block 12. In the case of USB, this is required to guarantee that the current taken from the bus be limited to 100 mA or 500 mA. For the case of 1394 the supply regulator 12 is required to attenuate a possible 48V to the 5V or so maximum that the power supply system circuitry can tolerate. Techniques for such regulators, generally involving sensing the output voltage and current and feeding these signals into one or more feedback loops are well known to those versed in the art.

In an alternate mode of operation, some or all of the required supply current can be sourced externally (13) via a transformer (not shown) attached to the mains, or perhaps from a 12V nominal source from a car battery. This supply voltage is again generally pre-regulated to 5V or so, for example by a linear or switching regulator (not shown). There may also be a means for selection between the bus (11) and the external (13) supplies, for example either diodes in series with one or more of these supplies or more intelligent control with comparators and controlled switches. For simplicity these are not shown in FIG. 1. These non-battery supplies (11, 13) are coupled to a common node or voltage rail Vsup, which is then supplied by one of these external supply sources (11 or 13).

Current supplied to the battery 10 must be regulated in current to limit the current when charging, and in voltage to prevent over-charging of the battery. This function is achieved using a charging control block or circuit 14. For example a Li-ion battery will typically be charged at constant current (typically 0.5 to 1.0 C amperes, where C is the battery capacity in ampere-hours, say 800 mAh) until its terminal voltage reaches 4.2V, then it will be charged at constant voltage of 4.2V until the current taken drops to near zero. Techniques for such charger regulators 14, generally involving sensing the output voltage and current and feeding these signals into one or more feedback loops, are well known to those versed in the art.

Depending on the state of charge of the battery 10, its output voltage Vbat can vary from say 4.2V when fully charged to as low as about 2.7V before the battery becomes so discharged as to cause irreversible degradation in its capacity. As high-current loads (e.g. motors) are switched on and off, this battery terminal voltage may also vary due to the output impedance of the battery (say 100 mΩ). Some circuitry may be able to accept this unregulated voltage direct from the battery. This may be attractive in terms of system cost. However most circuitry will require a cleaner, better regulated, supply, perhaps regulated at 1.8V or 3.3V for logic circuitry, and higher voltages for other applications, such as 7.2V for driving banks of white LEDs for example. There will thus generally be one or more voltage regulators 15a and 15b driven from the battery line Vbat.

Depending on the input and output voltage levels, the efficiency required, and the cleanliness required of the supply, these voltage regulators 15 may be capacitive charge pumps, or inductive buck or boost switching regulators, or linear regulators. These are shown in simplified from in FIG. 1a, and in more detail in FIG. 2. FIG. 2a shows a low-drop-out linear regulator; FIG. 2b shows a non-low-dropout linear regulator; FIG. 2c shows a buck switching regulator; FIG. 2d shows a buck-boost switching regulator; FIG. 2e shows a boost switching regulator, FIG. 2f shows a non-inverting boosting capacitor charge pump regulator, and FIG. 2g shows an inverting capacitor charge pump regulator. Many other well-known variants of regulator exist, including those where diodes are replaced by appropriately switched pass transistors.

Except for the simple boost regulator (FIG. 2e), all these circuits contain a switch-type input pass device Mp connected directly to the input supply, and to a regulator internal or output node Vx. The charge pump of FIG. 2f includes two such devices. The boost regulator of FIG. 2e includes an input inductor rather than a switch-type device and which is connected to a similar internal node Vx.

However boost regulators will typically incorporate a current sense resistor or MOS mirror arrangement to sense the input current to give better loop stability. A MOS mirror arrangement coupled to the input of a boost regulator is shown in FIG. 2h. This includes a pass device Mp inserted in series with the input supply Vdd, and a smaller MOS mirror device Mps connected in parallel, with common source and gate connections. This generates a scaled replica of the current through Mp, which can help stabilise the PWM control loop. The current monitoring function can also be useful in implementing a current limit function to protect the circuit. The pass device Mp can also be used to isolate the battery from the output to prevent leakage when the switcher is off; for example from a battery to an output load.

Note that the various pass devices are shown as MOSFETs but may be any suitable device including NMOS, PMOS, diodes, or bipolar transistors or even relays where suitable.

Generally, if the alternate supply (13) is available, it will be used in preference to the bus supply (11) or the battery (10). If no alternate supply is available, the bus supply will be used if possible. Only if neither the bus supply nor the alternate supply is available will the battery supply (10) be used. This operation can be realised for example by sensing the voltage on the various supplies and controlling various switches depending on which of these supplies exceed respective thresholds. Such control techniques are well known to those skilled in the art.

An example of a similar type of power supply is disclosed in Maxim Integrated Products' data sheet reference MAX1874. As shown in FIG. 1b, this merges transistors or pass devices Ma and Mb and their controls 12 and 14 from FIG. 1*a*, and couples the alternate supply to the battery via a parallel transistor Mb2 and control 14'. This chip does not include the downstream regulators, but they would typically be connected to the battery as shown, to allow the system to function powered from the battery in the absence of the supplies.

One problem with this type of scheme relates to the time which the system takes to become active when powered from the bus (11) or alternate (13) supply with a discharged battery 10. The load regulators 15 will have a minimum input voltage, perhaps 3.2V, (or maybe as high as 3.6V for a 3.3V linear low-dropout regulator—FIG. 2*a*), whereas the battery may initially be discharged below this voltage. Thus the system supplied by the load regulators 15 will not work properly until the battery 10 is charged up. Where the battery is heavily discharged, this might take several minutes or longer. If the battery is deeply discharged, below say 2.5V, the battery charging current is in fact typically reduced by a factor of ten in order to minimize battery capacity degradation effects and also as a safety mechanism due to the fact that in the absence of adequate power there may be no software control of the system. In this situation the wake-up time will clearly be even longer. This behaviour is undesirable to consumers who now desire "instant-on" behaviour.

A further problem is that the charger current control 14 or 14' limits the current to the node Vbat, to avoid too rapid charging of the battery 10. However it cannot differentiate between current taken by the battery 10 and that taken by the other loads, for example the regulators 15. Thus if the battery charging current is limited to 100 mA, then the total taken by the loads is also limited to 100 mA. Thus if they take 99 mA, only 1 mA is available to charge the battery, further increasing the time required for the system to operate properly. Even if the error is less gross than this, and say there is only a 25% reduction in charger current actually reaching the battery, this may well confuse the analog or digital control of the battery charging process, affecting the effective Icharge-Vbat trajectory, and causing a charging time that is still sub-optimum, even allowing for the 25% reduction in battery charging current.

In this kind of scheme the system current is also limited to the maximum current allowed by the charger 14 or 14', which means that whenever the overall system current (including regulator input current) requires a higher current than allowed by charger control, this current would be drained out of the battery 10. This is not just extending charging time it is also decreasing the battery life time.

The circuit could be improved by sensing current flowing only into the battery 10, while controlling all current into Vbat, but this still does not guarantee adequate current into the other loads 15, as the splitting of current will be defined by the respective V-I characteristics of all circuits connected to the Vbat node, including the battery, so a discharged battery would tend to steal current away from loads expecting a higher voltage. This means that this current would be taken by the battery 10 as a priority, rather than by the loads 15 as a priority FIG. 3 illustrates one solution to this problem of the "instant-on" requirement. The load regulators 15 are now supplied from the bus supply and external supply common node Vsup, rather than directly from the battery 10. As the battery node Vbat can be isolated (switch Mc and charging control 14) from this common supply node Vsup, the system can wake up as soon as power is applied either from the bus (11) or the alternate (13) supply. Only when neither the alternate supply (13) nor the bus (11) can supply current, an additional battery switch Mc is turned on, and the load regulators 15 are then supplied from the battery 10.

Examples of similar arrangements are disclosed in Linear Technology Corporation's data sheet references LTC3455 and LTC4055.

In these cases the battery charger supplies only the battery, so the charging current can be accurately monitored to allow intelligent control of the charging current-voltage trajectory.

Also when driving the system from the bus or alternate supply, this arrangement avoids the power losses associated with passing current through the charger regulator prior to being input to following switching regulators. Efficiency per se may not be a major concern when driving from non-battery supplies, but reducing power dissipated may allow less heat-sinking and hence lower system cost.

The main problem with this solution is the extra voltage drop between Vbat and Vsup when the load regulators 15 are driven from the battery 10 compared to the system of FIG. 1. The battery voltage is at best 4.2V, and should work down to as low as possible to extend operating time between battery recharging (albeit avoiding deep discharge, below about 2.6V). The load regulators 15 require a minimum input voltage (regulated output voltage plus dropout voltage) in order to maintain regulation of their output voltage, so the regulators will continue to function correctly until the battery discharges to this minimum input voltage. However the voltage drop across this additional switch device (Mc) effectively increases the minimum voltage required from the battery, and hence reduces the time the battery can provide this. The voltage drops across switch devices (Ma, Mb, Mc) increases with their on-resistance.

Given the technologies available today, these switch devices will generally be implemented using MOS switches, rather than bipolar transistors or relays. Lower on-resistance discrete MOS switches are more expensive as they require larger silicon area or more complex and specialized wafer processing. More particularly, for systems where most of the circuitry of FIG. 1 or 3 is implemented on a single chip, the total area required for these switches has not only an impact on chip area and hence cost, but also may require so much area that the silicon die may not fit in the desired plastic package. This is especially critical for portable equipment such as MP3 players or mobile phones, where the size of the whole system is an important specification and requires the smallest possible package size.

To allow Vbat to reach 4.2V when fed from a 4.5V bus supply (11), Ma and Mb might be sized to drop 150 mV each at peak battery charging current. But the sizes of input transistors Mp in the switching or linear load regulators 15 will define a minimum input voltage to keep their respective outputs in regulation. So either a substantial reduction in operating battery life has to be tolerated, or the input switches Mp of the load regulators 15 have to be greatly enlarged and possibly even extra bond wires and package terminals added as the parasitic resistances involved in tracking the current from chip to the outside world are significant. For example if a minimum battery voltage of 3.6V has to supply a 3.3V output linear dropout regulator 15*b*, then battery switch Mc and the regulator's pass device Mp have to be designed for a 150 mV drop-out voltage each at peak load current.

There is also a possible issue of problems arising from modulation of the voltage on Vsup caused by load variations on the load regulators 15. As downstream peripherals are plugged in, or as a disc drive internal to the battery-powered peripheral starts up, there can be a rapid surge in supply demanded from one regulator 15*a*. This will appear as a current step on Vsup, giving a voltage step across the on-resistance of Mc, and this may be enough to transiently reduce Vsup below the minimum input voltage for another regulator 15b on Vsup, or at best give a transient on this regulator output due to its finite line regulation. Even when the line regulation is good at d.c., it falls off with frequency, so voltage steps on Vsup may still give transients on the regulator outputs.

If Mc is controlled in a local regulation loop, rather than just being turned on, this may reduce transients, but this loop will again have finite gain and bandwidth, so there will still be transients at some level. This would also increase the complexity and hence cost of the circuit arrangement. Also if Mc is regulated for example to deliver a Vsup at a fixed voltage difference below Vbat, this voltage difference will then have to be set to a worst-case voltage drop, which will make battery voltage headroom under non-maximum load conditions even worse.

SUMMARY OF THE INVENTION

In general terms the present invention provides a dual or multiple supply rail for the load regulators of a power supply circuit for a battery powered device. One supply rail is coupled to the battery, and the other is coupled to a non-battery source such as an external mains regulated source and/or a bus power wire from a USB cable or similar. Where a third supply rail is used, this may be supplied from solar cells for example, and where multiple regulators are used may be coupled to a sub-set of these. The regulators are supplied from either supply rail but through different pass or switch devices.

Preferably the regulators have dual (triple or more) inputs each with an associated pass or switch device, and each for taking their input voltage directly from one of the supply rails.

The regulators can be powered from either battery or non-battery sources, but these sources are provided to the regulators via different pass devices or transistors. This allows the different pass devices to have different on-resistance by for example being of different sizes and/or types in order to optimise cost or performance. Preferably these pass devices are integral with the regulators themselves.

The two or more supply rails are effectively isolated from each other when the battery is supplying the regulators.

The pass device will typically be a switch type of device such as a transistor, diode, relay, or even a resistor, however certain types of regulator require a different type of pass device, and the dual input version of this will therefore require two of these input pass devices. For example a boost regulator may utilise a simple resistor for sensing the input current and so a dual input version could therefore use two such sensing resistors, together with some switching mechanism for isolating the supply rails. Depending on the embodiment, the pass devices can be used to (at least partially) isolate the supply rails from each other. In other embodiments such as the linear regulator a switching arrangement can be used.

In an embodiment two supply rails are connected directly to respective inputs of the regulators. As there is no switch between the battery and the load regulators, there is no voltage drop across such a switch device when power is supplied from the battery. This reduced voltage drop from the battery can be used to improve effective battery life.

The improvement in battery life can be traded off against reduction in size of the input transistors required by the battery inputs of the regulators and/or the cost and size of the battery. Also the devices required for the non-battery inputs of the dual-input regulator can typically be made smaller, since the minimum non-battery source supply voltages are usually greater than the minimum battery voltage, and efficiency is not so important in the case of non-battery supply. So despite the extra transistors required to implement the dual-input regulators, the total transistor area will typically be reduced.

The reduction in total pass device (transistor) area not only reduces manufacturing cost, but the reduced transistor capacitance also reduces the power consumed by switching these devices in switching regulators. The reduced transistor capacitance also improves stability of linear regulators, and additionally reduces capacitive coupling of noise on these supplies to other circuitry on the same chip.

At the same time, the "instant-on" feature is available when power is supplied from the non-battery (bus or external) source.

In particular in one aspect the present invention provides a portable power supply circuit for a portable battery powered device, the circuit comprising: a number of inputs for receiving respective voltage supplies and coupled to respective power supply buses, one of the voltage supplies being a non-battery voltage supply coupled to a first power bus and another of the voltage supplies being a battery voltage supply coupled to a second power bus; a common multiple input regulator for providing a regulated power supply to said battery powered device, the regulator having said number of input pass devices, one said pass device connected directly to a respective power bus, the common regulator arranged to derive the regulated power supply from one of said power buses. Preferably the circuit also comprises a charging circuit for charging the battery supply and coupled between the non-battery and battery voltage supplies.

In another aspect there is provided a power supply circuit for a battery powered device, the circuit comprising: an input for receiving a first non-battery voltage supply and coupled to a first power bus; an input for receiving a second battery voltage supply and coupled to a second power bus; a common load regulator having two input devices, one said input device connected directly to the first power bus and the other said input device connected directly to the second power bus, the common regulator arranged to derive the regulated power supply from the first power bus or to derive the regulated power supply from the second power bus; and a charging circuit coupled between the first power bus and the second power bus.

The common load regulator input devices can be optimised depending on which power bus they are connected to. For example the "non-battery" input devices can be made small because their on-resistance is not critical. Whereas the "battery" input devices can also be made smaller than known arrangements corresponding to FIG. 3 because no additional battery switch is required. On the other hand, the power supply circuit provides "instant-on" power from the non-battery supply irrespective of the charge state of the battery, unlike known arrangements corresponding to FIG. 1.

The load regulator input devices will typically be MOS based transistors such as MOSFETS, but could be other devices, such as diodes or bipolar transistors The power supply circuit may include many load regulators, all supplied by the above dual power bus arrangement.

In an embodiment a common or multi-input regulator comprises switches in order to switch between a sub-circuit for regulating the first power bus voltage and a sub-circuit for regulating the second power bus voltage supply.

The common load regulators may include low and non-low dropout linear regulators, buck switching and buck-boost switching regulators, and capacitor charge pump regulators. The use of boost regulators is also possible, especially when used with input pass devices such as MOS based input current sensing arrangements. The regulators will usually be voltage regulators, but could be constant-current regulators, or may be switchable into constant-current modes, for example for "Hot-swap" applications.

In particular in another aspect there is provided a power supply circuit for a battery powered device, the circuit comprising: an input for receiving a first non-battery voltage supply; an input for receiving a second battery voltage supply; a load regulator coupled to the first supply by a first switch device and coupled to the second supply by a different second switch device; and a charging circuit coupled between the first non-battery voltage supply and the second battery voltage supply.

The first and second switch devices are coupled to different regulator inputs. Preferably the switch devices are input transistors integral with the regulator. Preferably the devices are MOS based transistors.

Preferably the first and second switch devices have different on-resistances. This may be achieved with the use of different chip area.

In general terms in another aspect there is provided a dual or multi input regulator having two or multiple input MOS based transistors for receiving input voltage from two or more different sources; for example a battery source and a non-battery source.

The regulator is internally switched in order to form an effective regulator circuit with one of the input transistors depending on which input voltage is used.

This allows the respective input transistors to be sized according to their source, and can allow overall reductions in transistor chip area as discussed above.

In particular in another aspect the present invention provides a multiple input regulator for providing a regulated power supply to a portable battery powered device, the regulator having: regulator circuitry such as a linear regulator for regulating an input power supply from one of a number of power supply buses; a number of input pass devices each connected directly to a respective power supply bus; switching means for switching the pass devices in and out of the regulation circuitry in order to derive the power supply for regulation from the respective power supply bus.

In another aspect there is provided a multiple input regulator for providing a regulated power supply to a portable battery powered device, the regulator having: boost regulator circuitry comprising an input inductor and for regulating an input power supply from one of a number of power supply buses; a number of input pass devices each connected directly to a respective power supply bus; the regulator arranged such that the input pass devices are coupled to the input inductor and switched in order to derive the power supply for regulation from the respective power supply buses.

There is also provided a dual or multiple input regulator for a power supply circuit, the regulator comprising: two input pass devices, one said pass device for connecting directly to a first power bus and the other said pass device connected directly to a second power bus, the regulator arranged to derive the regulated power supply from the first power bus or to derive the regulated power supply from the second power bus; wherein the two pass devices are MOS-based transistors.

In one embodiment of the regulator, the two input transistors each have first connections connected respectively to the two voltage supply buses; the two input transistors each having second connections connected to a regulated output, the output being connected to an input of an error amplifier, the other input of the error amplifier being connected to a reference voltage; the two input transistors each having third connections switchably connected to the output of the error amplifier.

In a further alternative, the two MOS based input or pass devices are implemented as current sensing arrangements coupled to an input inductor, for example in the case where the regulator is a simple boost type. These pass devices provide (DC) isolation of the supply rails.

The embodiments are well suited to application in portable electronics devices or consumer electronics devices such as MP3 players, smart phones, mobile phones, cameras and camcorders, and portable computing devices. Such apparatus typically utilise low voltage supplies such as 5V unipolar in which the voltage drops across individual circuit components can be relatively significant. Such devices typically avoid the weight and space of a transformer by having power inputs that are substantially constant, as opposed to AC or chopped DC input supplies for example.

BRIEF DESCRIPTION OF THE DRAWINGS

Embodiments are described with reference to the following drawings, by way of example only and without intending to be limiting, in which:

FIGS. 2a to 2h show regulator circuits suitable for power supply circuits for portable battery powered devices;

DETAILED DESCRIPTION OF THE EMBODIMENTS

Figure 1A:
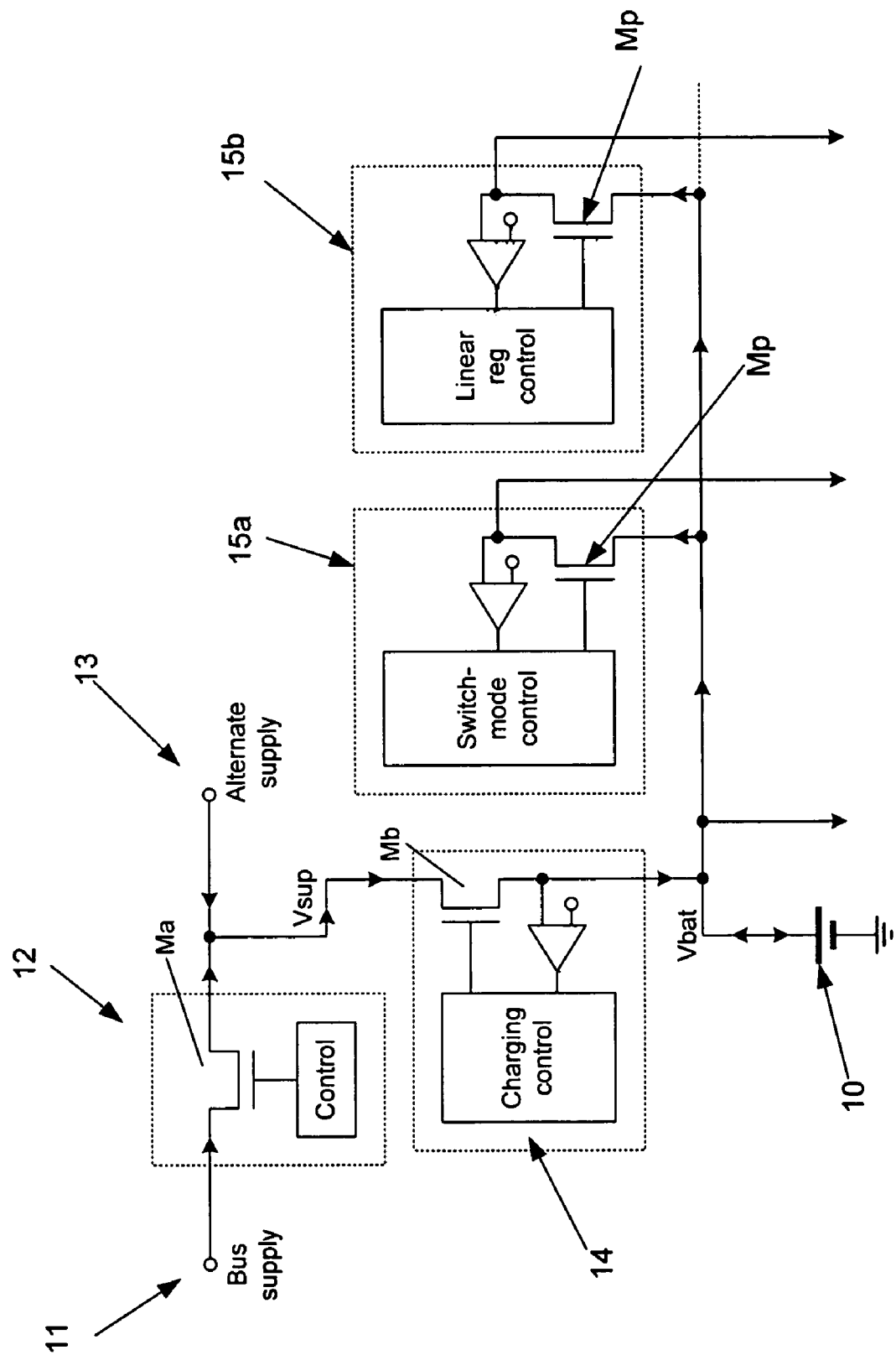
FIGS. 1a and 1b show known power supply circuits for portable battery powered devices.
Figure 1B:
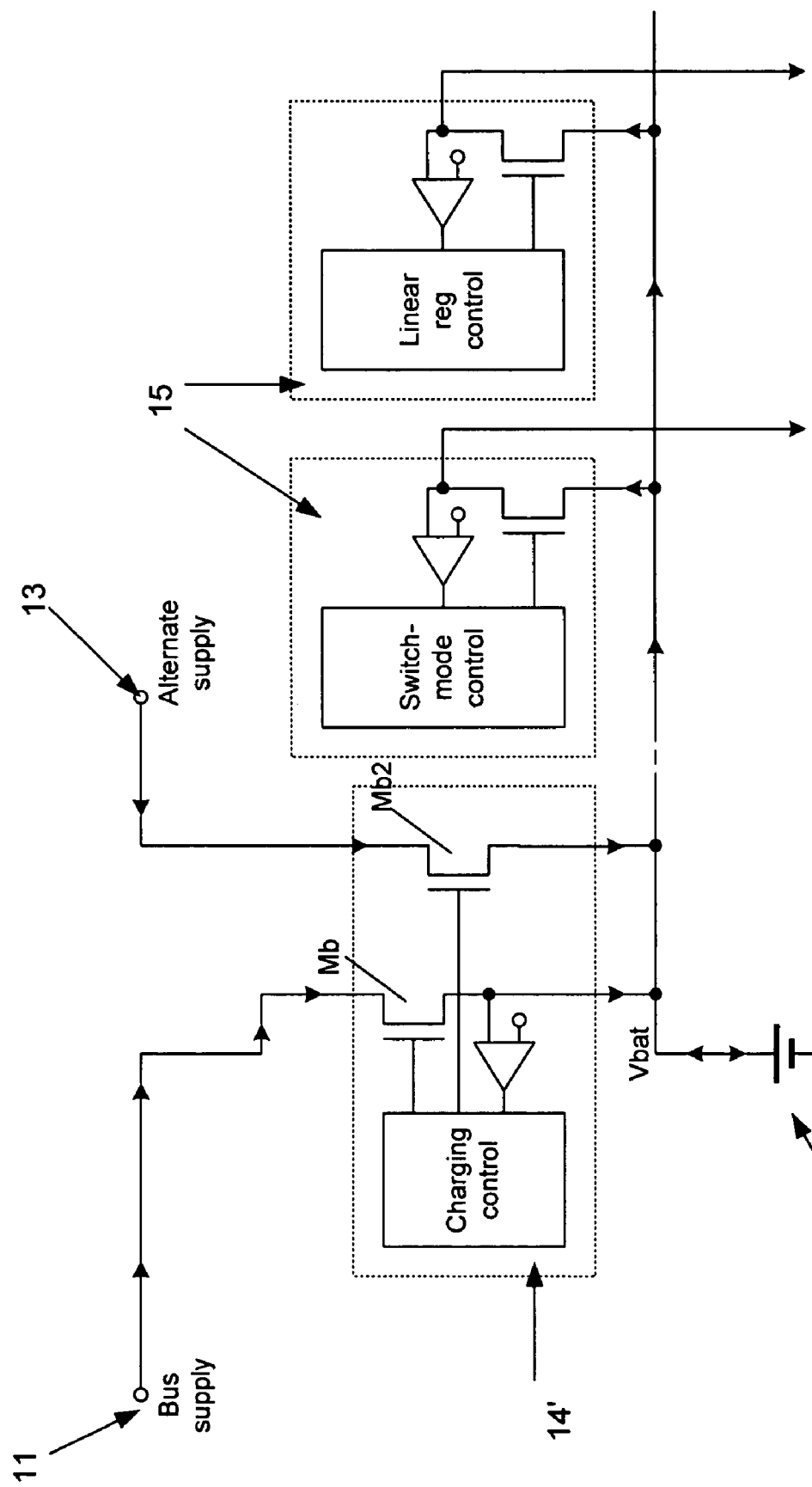
Figure 3:
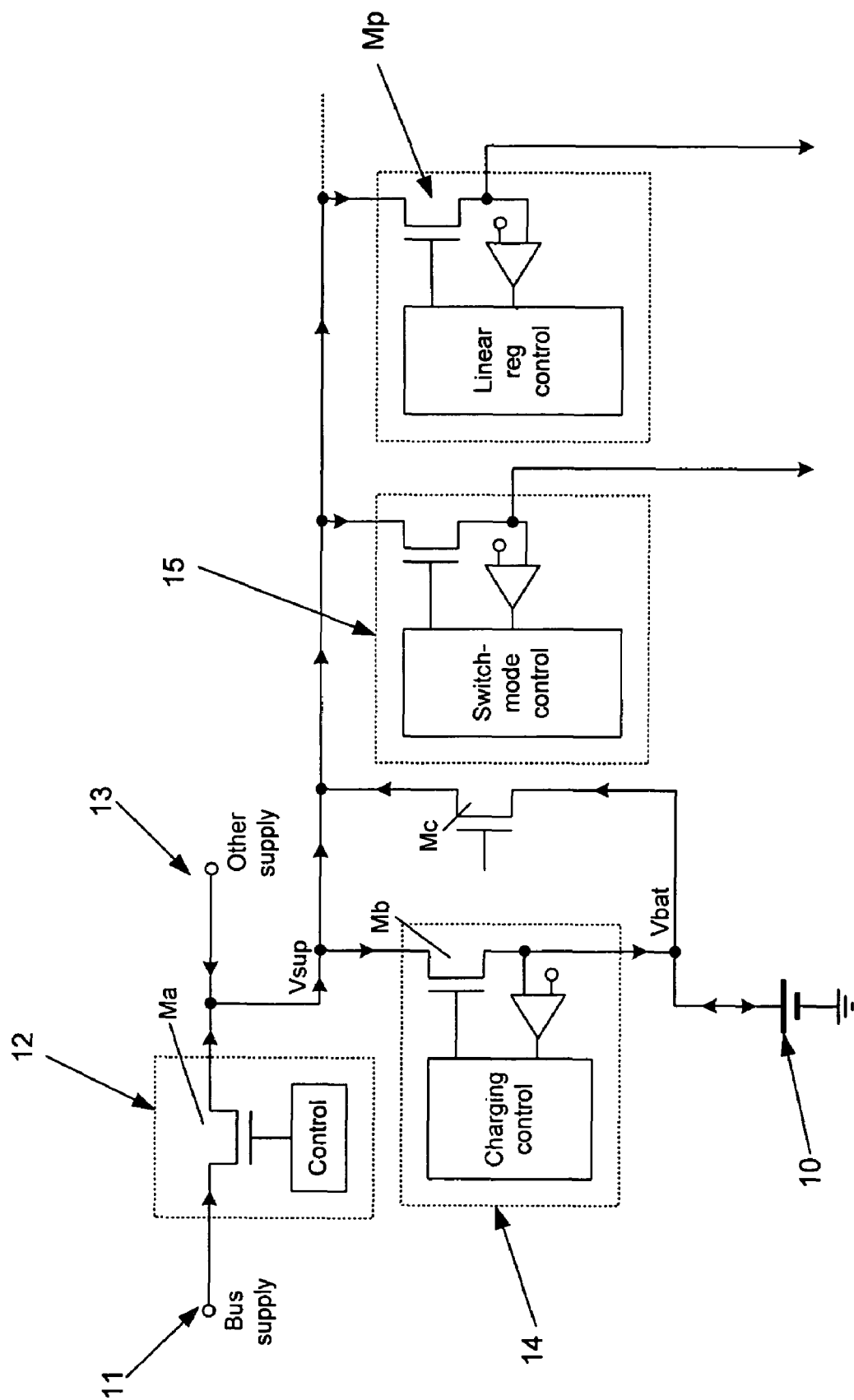
FIG. 3 shows another known power supply circuit for portable battery powered devices.
Figure 4:
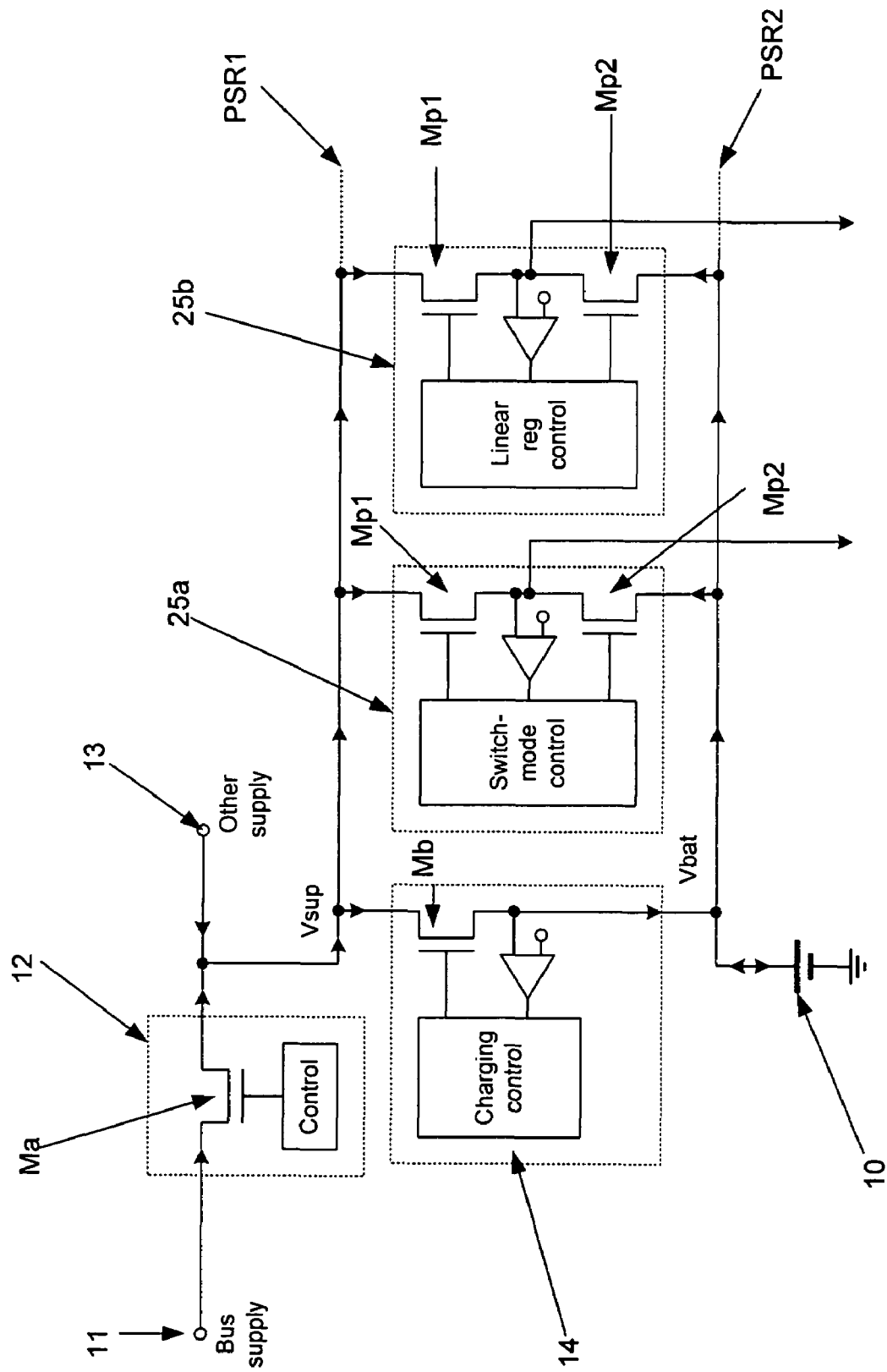
FIG. 4 shows a power supply circuit for portable battery powered devices according to an embodiment.

FIG. 4 shows a power supply circuit according to a first embodiment and comprises two non-battery power supplies, a bus supply 11 such as the power wires in a USB cable, and an external supply 13 such as a pre-regulated mains source. A bus regulator 12 conditions the bus supply 11, and this and the external supply 13 are connected at a common non-battery supply node Vsup which is coupled to a first power supply rail or bus PSR1. As with the systems of FIGS. 1 and 3, a battery charger circuit 14 is coupled between the non-battery common supply node Vsup and a re-chargeable battery 10. Other components in common with FIGS. 1 and 3 are referenced the same. The battery 10 of FIG. 4 is connected to a second power supply rail or bus PSR2 (also Vbat). Thus two power supply rails (PSR1 and PSR2) are provided for the load regulators 25.

The load regulators 25 each have two inputs, each with an associated pass device Mp1 and Mp2. One such input (Mp1) is connected directly to the first power supply rail PSR1, and the second load regulator input (Mp2) is connected directly to the second power supply rail PSR2. The dual input load regulators 25 are described in more detail below, however as with the regulators of FIGS. 1, 2, and 3, these can be linear or switch mode or capacitor charge-pump based.

Because one input (Mp2) of a regulator 25 is connected directly to the battery 10 via the second power supply rail PSR2, there is no voltage drop from the battery 10 to the regulator 25 as there was in the arrangement of FIG. 3. This increases battery life between charges as it can discharge to a lower level whilst still supplying a minimum input voltage to the regulator 25 in order for this to maintain its output regulation. It can also be seen that because the first power supply rail PSR1 is independently provided to the regulators 25, they can be instantly started when the non-battery sources (11 and/or 13) become available, even when the battery 10 is discharged. Thus the embodiment also overcomes the "instant-on" problem of the arrangement of FIG. 1a and 1b.

When power is available either from the bus 11, or from the external source 13, the load regulators 25 are driven directly from Vsup, rather than Vbat. But when these supplies are both absent, the load regulators 25 are supplied from Vbat, i.e. directly from the battery 10. This removes the voltage drop caused by Mc in FIG. 3, at the expense of additional input transistors in each regulator. However this can significantly increase battery life which is in great demand by consumers of battery powered devices.

Compared to the case (FIG. 3) where Mc would have dropped 150 mV, this allows an extra 150 mV in battery voltage: if this means the battery can discharge from 4.2V to 3.45V instead of 4.2V to 3.6V, i.e. by 750 mV rather than 600 mV, this gives an extra 25% battery life.

Alternatively, if cost is paramount, the "battery-side" input transistors Mp2 of the load regulators 25 can be reduced in size to drop say 300 mV rather than 150 mV. Consider first the case of a system with only a single regulator 15. In this case, rather than battery switch Mc (sized for 150 mV) and "external supply side" regulator pass device Mp (sized for 150 mV) in the circuit of FIG. 3, we now only need a single, "battery-side", regulator pass device Mp2 (sized for 300 mV) in the circuit of FIG. 4. The on-voltage at the rated current is defined by the on-resistance of the MOS, and this is approximately inversely proportional to area of the MOS. For a given on-resistances (R) for each of Mc and Mp to achieve a 150 mV voltage drop, and thus a total drop of 300 mV from the battery 10, the on-resistance of Mp2 can be double Mc or Mp (i.e. 2R) and still achieve double the volt drop (300 mV). So instead of two transistors Mp and Mc, each of resistance R, and corresponding area A, we now need only one MOS (Mp2) of resistance 2R and corresponding area A/2, and hence only a quarter of the area in total. The same argument applies to the case of multiple regulators, assuming Mc is sized to drop 150 mV for the total current of all the regulators and the input device Mp or Mp2 of each regulator is sized to drop 150 mV or 300 mV respectively at the peak current of each regulator.

In addition, whilst we require the transistors Mp1 connected to the first power supply rail PSR1 (Vsup), these will only have to cope with a minimum Vsup of say 4.35V (4.5V bus supply 11, less 150 mV for Ma). This means that these transistors can be designed for a 1.05V drop-out rather than 150 mV, so can be made much smaller, and so the overall chip area occupied by the transistors Mp1 is not significant compared to the potential saving in area from removing Mc and shrinking Mp to serve as Mp2.

The efficiency of linear regulators will be unaffected by this sizing, since power dissipated is the product of the load current and the input-output voltage differential. The efficiency of any switching regulators when driven from PSR1 will however be degraded by increasing the respective Mp1 switch resistances. Reduced efficiency per se is not a major concern when using external supplies, but the resulting on-chip power dissipation may be, to avoid extra heat-sinking, or having to restrict the charger current during times of heavy switching-regulator current load, so this will place a lower limit on the size of Mp1. Even so, a substantial overall saving in area is possible.

The reduction in total pass device (transistor) area not only reduces manufacturing cost, but the reduced capacitance also reduces the power consumed by switching these devices in switching regulators, eases the stability of linear regulators, and also reduces capacitive coupling of noise on these supplies to other circuitry on the same chip.

In practice the design will be a trade-off between the potential reduction in die size and cost from reducing the total MOS area, and reducing the minimum battery voltage to prolong active battery life without increasing battery size and cost.

As a side benefit, as regards practical chip layout, it is easier to layout multiple smaller transistors rather than fewer big transistors, so the overall chip is much easier to layout in practice.

Regulator supply cross-talk when battery-fed is also reduced. This is where a peripheral on one load regulator 25a starts or suddenly draws a lot of power, which causes a dip in the voltage (Vbat) supplied to the other regulators 25b and hence may affect their outputs to other peripherals. In the arrangement of FIG. 4, as there is now no common switch impedance (Mc) in the path (only a modest non-zero output impedance of the battery), the path impedance is significantly reduced therefore reducing the potential voltage dip under these transient conditions.

Figure 5:
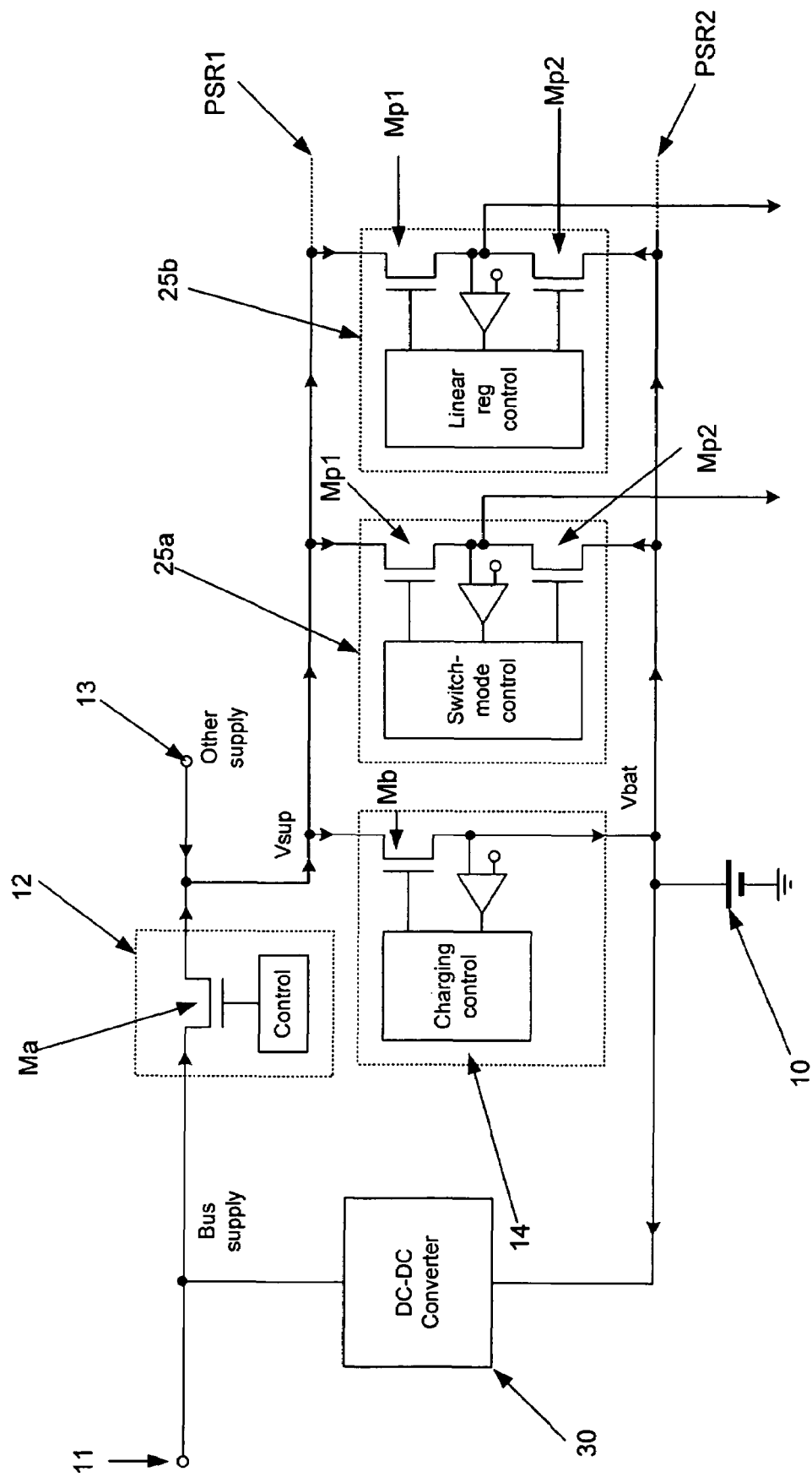
FIG. 5 shows a power supply circuit for portable battery powered devices according to another embodiment.

FIG. 5 shows a modification to the circuit of FIG. 4 in which a DC-DC converter 30 is coupled between the battery coupled power supply rail PSR2 and the bus supply 11.

In some recent bus standards, such as USB On-The-Go, the battery-powered peripheral may be expected to supply power to devices attached to the (USB) bus 11. Generally the voltage required (e.g. 5V nominal over USB downstream) is greater than the battery voltage (e.g. 3.0V to 4.2V), so a DC-DC converter 30 is required to up-step the battery voltage. In this mode, the path from the bus 11 to Vsup is turned off.

If the peripheral (i.e. devices coupled to the output of the load regulators 25) is powered from the alternative supply 13, it would be desirable to use this power, rather than discharge the battery 10, to power the bus 11 e.g. for USB downstream. In the circuit of FIG. 5, this would involve passing current through the charger regulator, effectively re-charging the battery to make up for the current drain through the bus. This is obviously inefficient, as voltage will be dropped from the say 5V of the supply 13, down to 4.2V or less of the battery, and then converted back up to 5V or so by the DC-DC converter. It would also increase the heat dissipated inside the package and therefore enlarge the possibility of thermal shutdown.

Figure 6:
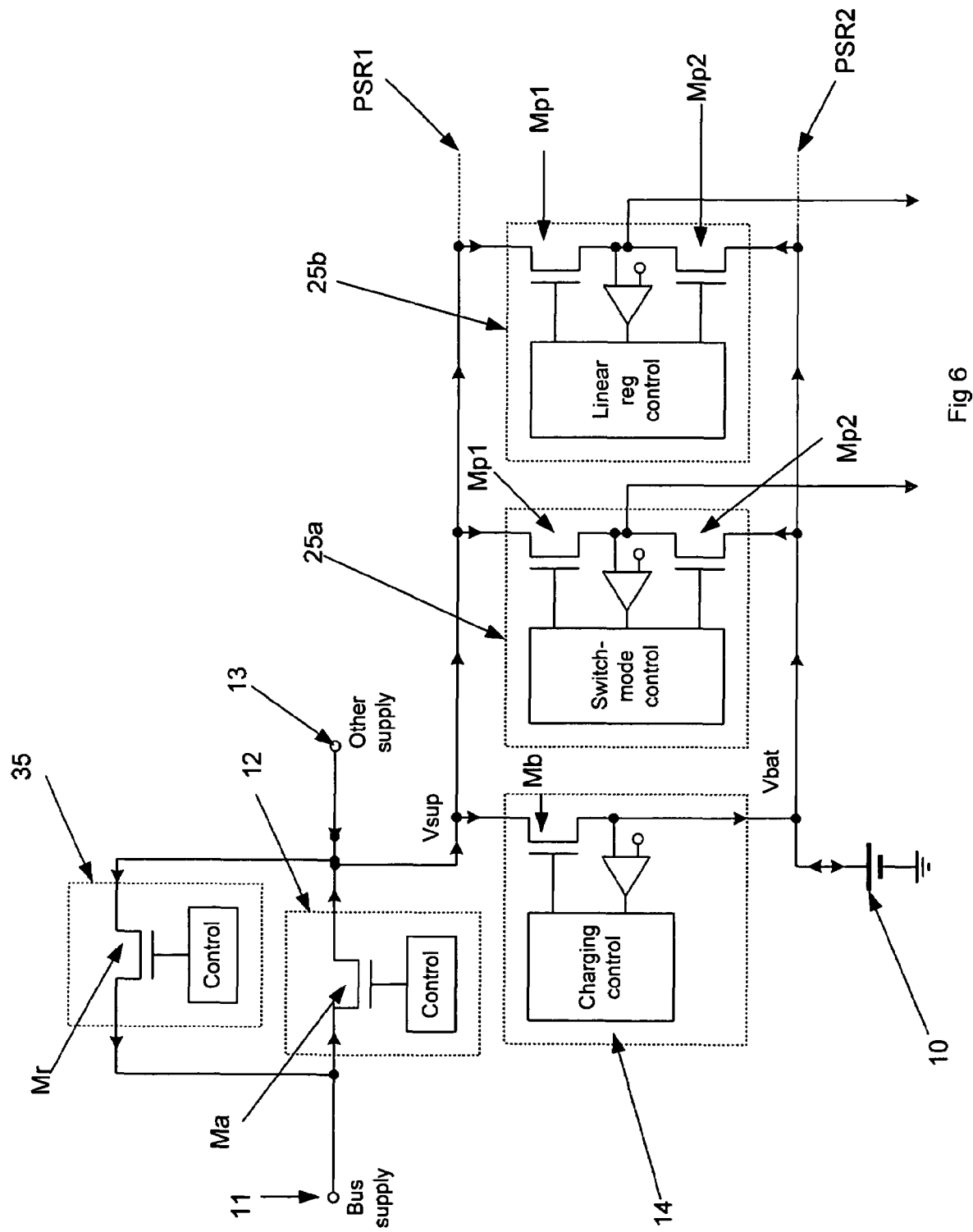
FIG. 6 shows a power supply circuit for portable battery powered devices according to another embodiment.

FIG. 6 illustrates a preferable solution in which another path is added, involving another pass device Mr and associated control circuitry 35 to provide a more direct path from the supply 13 to the bus 11 as shown, avoiding the efficiency and thermal problems. This also avoids distortion of the battery charging current as monitored by charger control 14 by the current that would otherwise have been taken by DC-DC converter 30, in the scenario where the supply 13 is supplying power to the system and the USB bus is requiring power.

Figure 7:
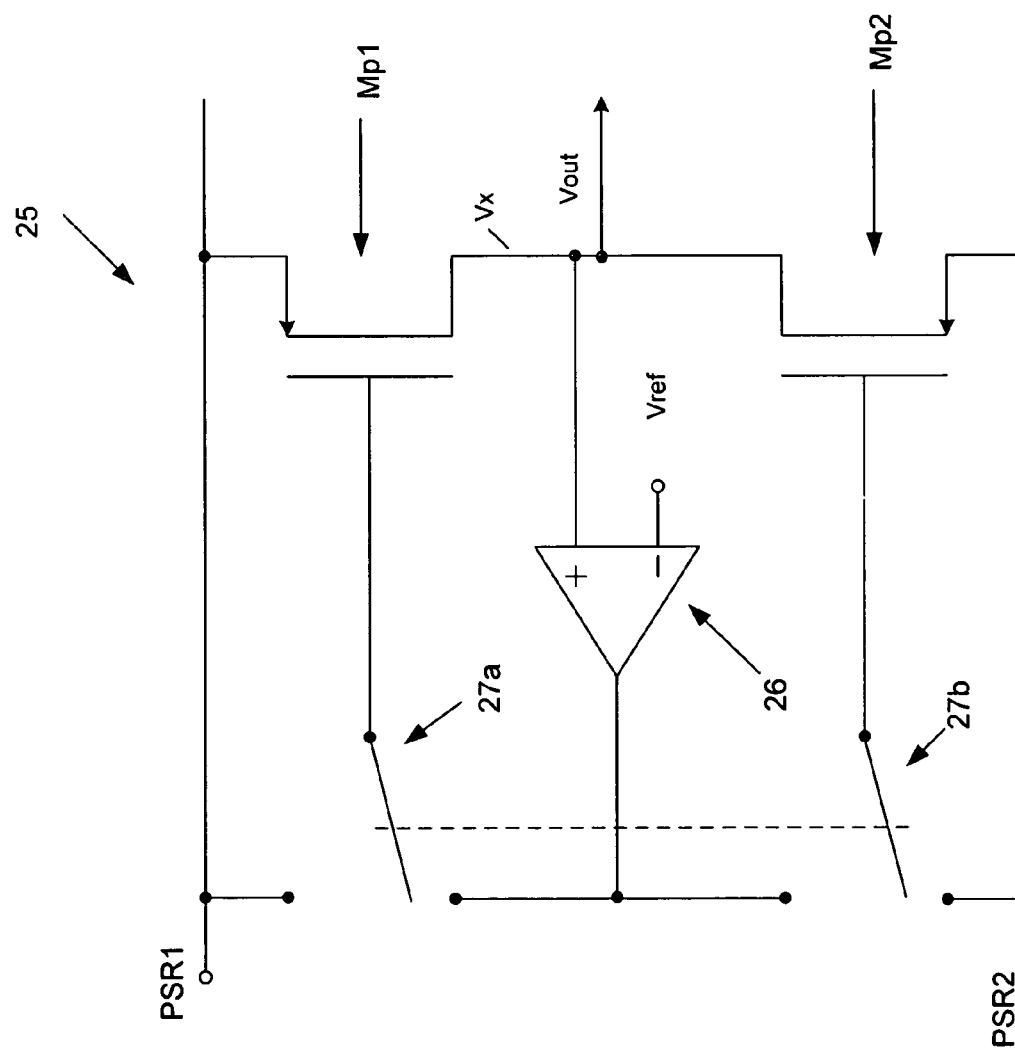
FIG. 7 shows a dual input low dropout linear regulator according to an embodiment.

Referring now to FIG. 7, a dual input low dropout linear regulator 25x is shown. The regulator 25 comprises two pass devices such as MOSFETs Mp1 and Mp2, an error op amp 26, and two switches 27a and 27b. The switches 27 are configured by control inputs (not shown) to arrange the regulator to accept either Vbat (from the second power supply rail PSR2 of FIG. 4) or Vsup (from the first power supply rail PSR1 of FIG. 4) as the regulator's input.

For example it can be seen in the configuration illustrated that Mp1 (coupled to PSR1) is effectively switched into the regulator circuitry whereas Mp2 (coupled to PSR2) is switched out, there being no connection between it and the error amplifier output. The output voltage Vout is compared to the desired voltage Vref by the error amplifier 26. If PSR1 is to act as supply, the output of the amplifier 26 is steered to the gate of PMOS MP1. Detailed operation of a linear regulator will be well known to those skilled in the art. If PSR2 is to act as supply, then the opposite connections are made.

Figure 2H:
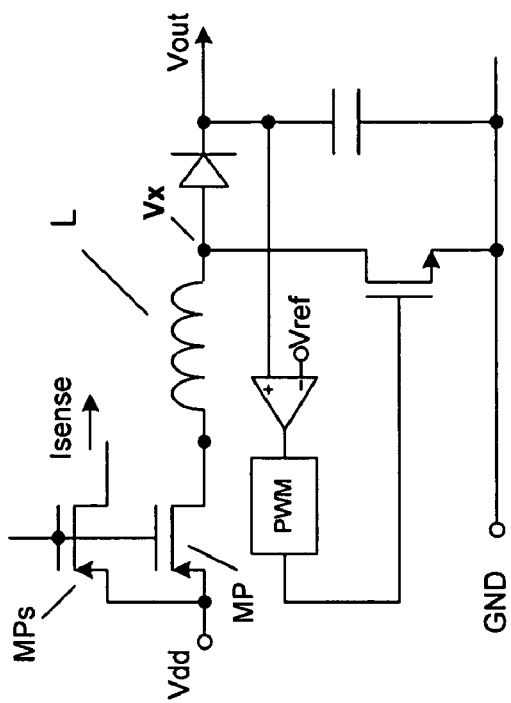
Figure 2F:
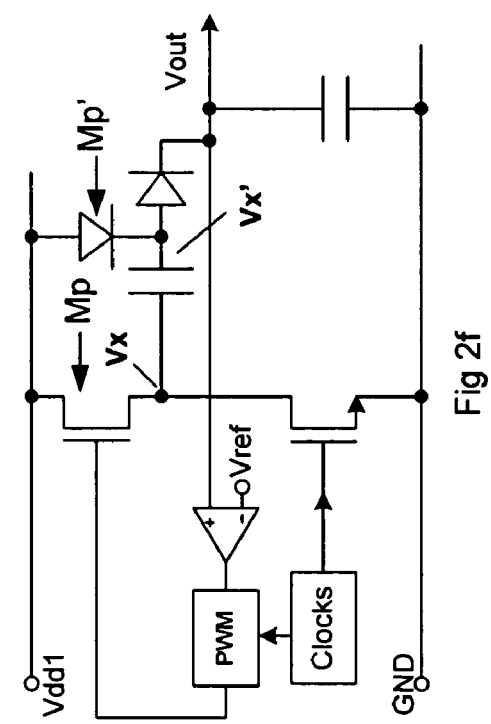
Figure 2G:
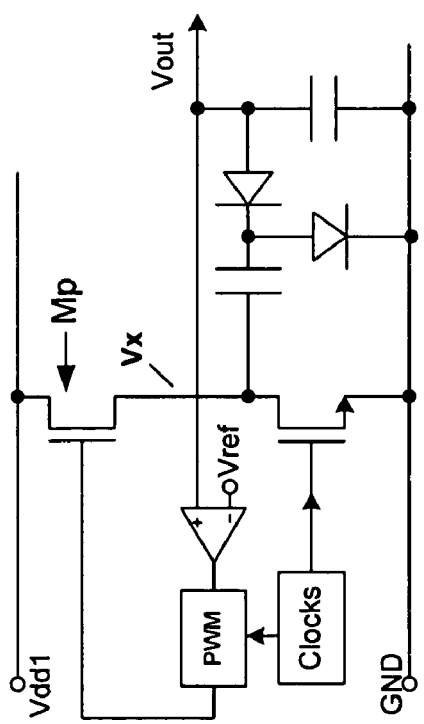

This dual input regulator corresponds to the linear regulator in FIG. 2a, and in which the common node Vx of the two pass devices is also the regulator output node. Other dual-input regulators may be designed in a similar fashion, with the pass device Mp shown in FIGS. 2b to 2d and 2f to 2h replaced by a pair of devices Mp1, Mp2. each connected to a respective supply rail and the common node Vx. In the case of the boost capacitor charge pump of FIG. 2f, there are actually two pass devices Mp and Mp', each to be replaced by a pair of devices Mp1, Mp2 and Mp1', Mp2' to the respective common internal nodes Vx, Vx'. In the case of the boost switching regulators of FIGS. 2e and 2h, the dual-input regulator would have a pair of input pass devices Mp1 and Mp2 having a common side coupled to inductor L, and the other side connected to respective supply rails PSR1 and PSR2 respectively.

Figure 8:
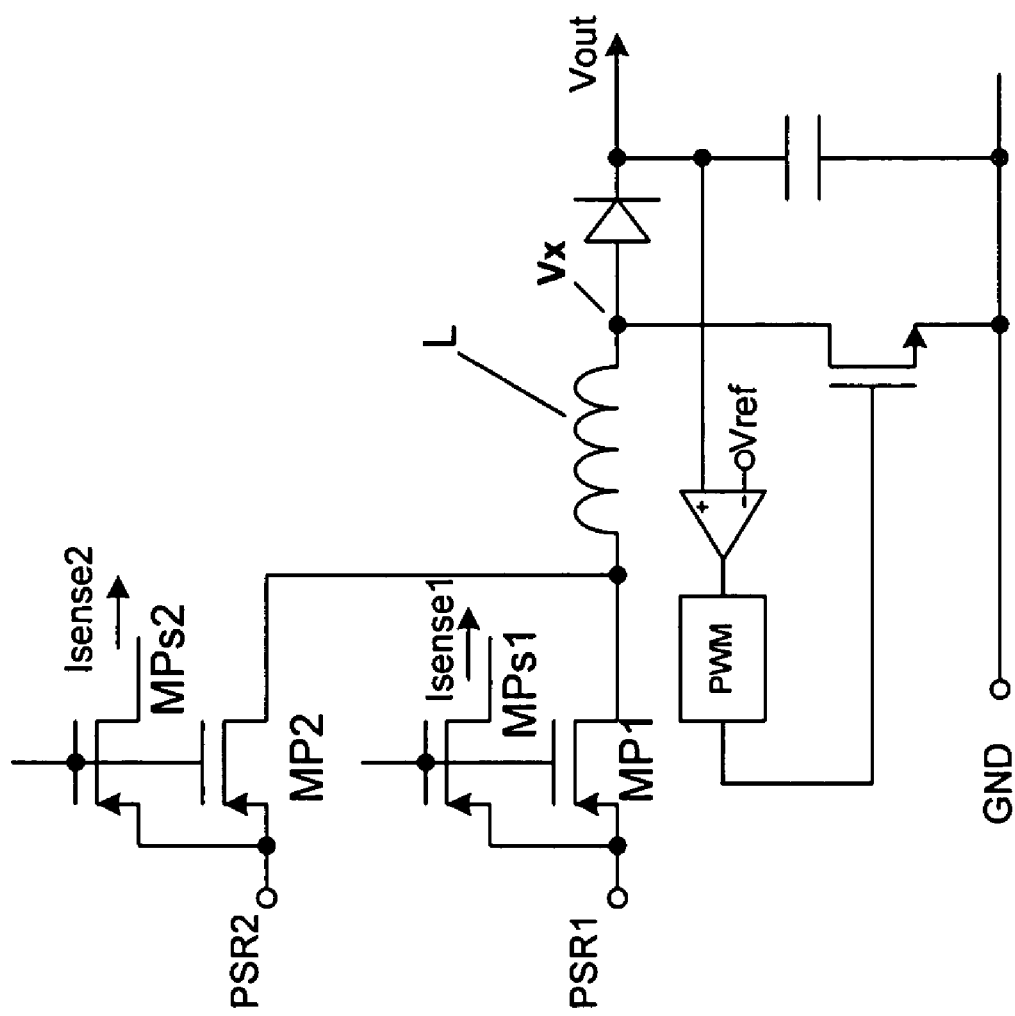
FIG. 8 shows a dual input boost regulator according to an embodiment.

FIG. 8 shows the dual input version of the boost regulator of FIG. 2h. Pass devices Mp1 and Mps1 are connected to supply rail PSR1 (line), and Mp2 and Mps2 are connected to supply rail PSR2 (battery). The input pass devices Mp1 and Mp2 are switched (using a constant bias or control voltage applied to their respective gates) depending on the available supply as discussed previously. The selected supply (PSR1 or PSR2) is then feed to the inductor L of the boost regulator. As previously discussed, the sense devices Mps1 and Mps2 provide a sensing current (Isense1 or Isense2) dependent on the input current through the respective pass device (Mp1 or Mp2) which can be used for control of the regulator.

Whilst the arrangement requires two pass devices Mp1 and Mp2, as noted above, the use of the two input pass devices removes the need for a battery pass device (Mc in FIG. 3) whilst at the same time providing "instant on" power when driven from the line supply following discharge of the battery. The lack of a battery pass device reduces cross-talk between regulators as discussed above.

Pass devices other than MOS based transistors could alternatively be used, such as bipolar transistors or diodes. In some cases or modes of operation the feedback circuitry may be omitted (such as an "open-loop" capacitor charge pump voltage doubler based on FIG. 2f) or disabled (perhaps to turn the pass device hard on under low-voltage conditions).

Figure 9:
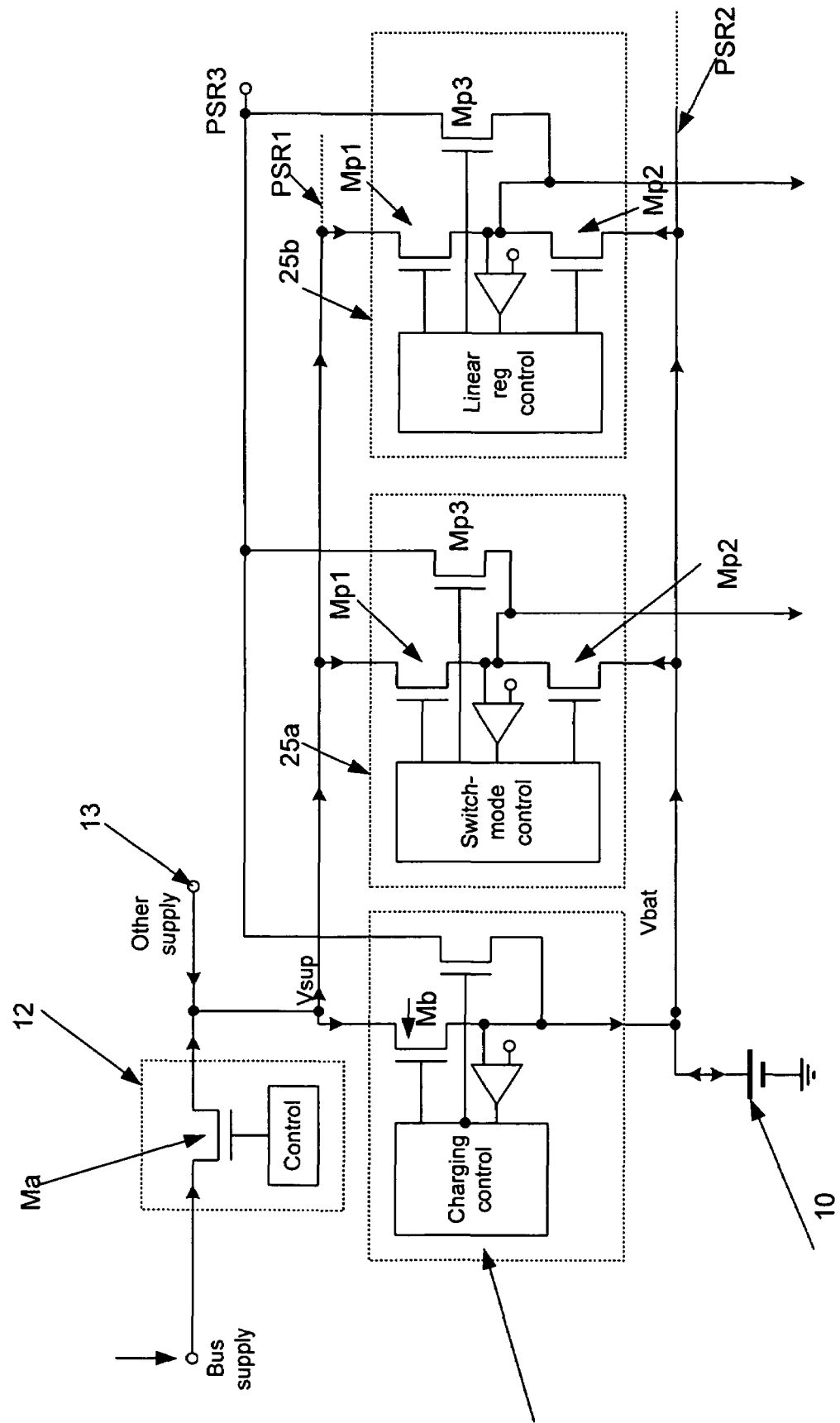
FIG. 9 shows a power supply circuit for portable battery powered devices and having three supply rails.

FIG. 9 shows a further embodiment in which multiple (i.e. more than two) supply rails are utilised to supply the or each regulator. As with the arrangement of FIG. 4 a supply rail PSR1 is provided from an external and/or bus supply, and a second supply rail PSR2 is provided from a battery 10. But additionally a third supply rail PSR3 is also provided for the regulator inputs. This third supply could e derived from another battery having a different voltage; a higher voltage input such as direct from a 1394 bus (or regulated down to some intermediate voltage); or an alternate energy source such as solar cells. The third (or indeed the second or first) could be routed to a subset of the regulators, to limit loading, at the expense of not allowing some features of the system to operate. FIG. 9 also shows a second input and associated pass device in the battery charger regulator.

Figure 10:
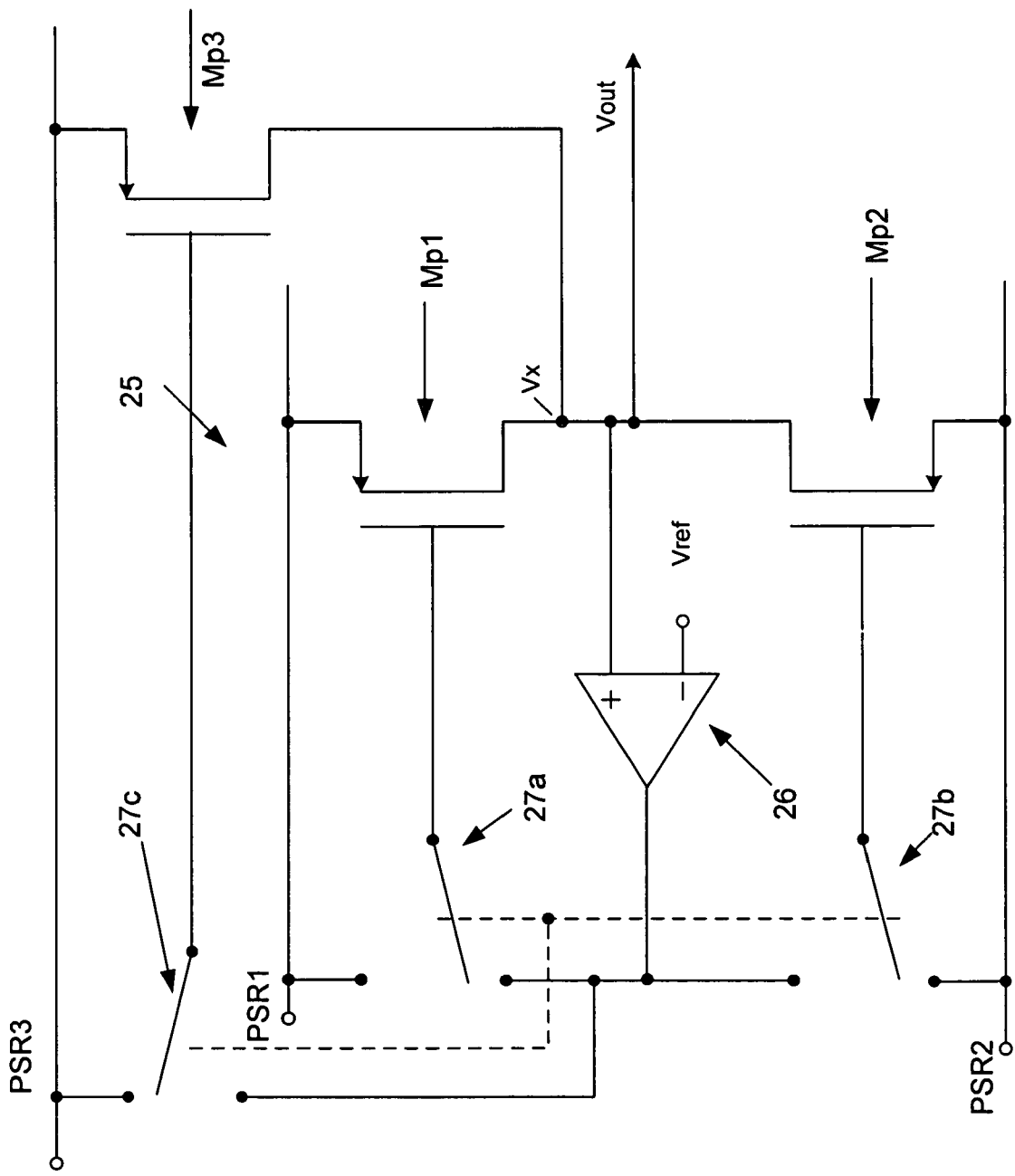
FIG. 10 shows a triple input low dropout linear regulator according to another embodiment.

FIG. 10 shows a tri-input linear regulator analogous to that of FIG. 7 but with an additional input from the third supply rail PSR3 and including additional pass device Mp3. As with the dual input regulator of FIG. 7, a control circuit (not shown) switches between the three supply rails, for example because the external voltage supply has been disconnected. The switching in this regulator circuit is achieved by suitably arranging the switches 27a, 27b and 27c to switch the corresponding pass device Mp1, Mp2, or Mp3 into the feedback loop of the regulator circuit. A suitable control circuit will be known to those skilled in the art. This compares with the boost regulator switching arrangement of FIG. 8 which was achieved by switching on one of the input pass devices Mp1, Mp2, and Mp3 (say Mp3), and switching off the other two input pass devices (Mp1 and Mp2) by applying appropriate bias or control voltages to the gates of the respective transistors.

Returning to FIG. 9 (or FIGS. 4, 5, and 6), the battery charger 14 is their shown as a linear regulator, however it of course could be any suitable charging circuit. For example the battery charger 14 could be implemented with a switched DC/DC converter which would provide better efficiency both to maximise output power and to minimise on-chip power dissipation that might otherwise limit output power. Another alternative is a capacitor charge pump.

The skilled person will appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A portable power supply circuit for a portable battery powered device, the circuit comprising: a number of inputs for receiving respective voltage supplies and coupled to respective power supply buses, one of the voltage supplies being a non-battery voltage supply coupled to a first power bus and another of the voltage supplies being a battery voltage supply coupled to a second power bus; and a common multiple input regulator for providing a regulated power supply to said battery powered device, the common regulator having a plurality of input pass devices, at least one of said pass devices connected directly to a respective power bus, the common regulator arranged to independently control said input pass devices to derive the regulated power supply from one of said power buses.

2. A circuit according to claim 1 wherein the pass devices are MOS-based transistors.

3. A circuit according to claim 1 wherein the common regulator comprises switches in order to switch one or the other said pass devices into a regulation sub-circuit in order to derive the regulated power from the respective power bus voltage supply.

4. A circuit according to claim 1 wherein the pass devices are used to switch between the power supply buses.

5. A circuit according to claim 1 wherein the at least one pass device connected directly to a respective power bus has a different on-resistance from another pass device connected directly to another power bus.

6. A circuit according to claim 1 wherein the common multiple input regulator is one of: a linear regulator; a switch mode regulator, a capacitor charge pump regulator.

7. A circuit according to claim 1, wherein the circuit comprises three or more power buses and a plurality of common input regulators, and wherein some of said power buses are coupled to all of said regulators and some other said power buses are coupled to a subset of said regulators.

8. A circuit according to claim 1 further comprising an input for receiving a second non-battery voltage supply and coupled to the first power supply bus.

9. A circuit according to claim 1 wherein a said non-battery voltage supply is a composite power and data cable connection or a solar cell.

10. A circuit according to claim 9 wherein the cable is a USB or IEEE1394 cable.

11. A circuit according to claim 9 further comprising a DC-DC converter coupled between the battery supply voltage input and the first non-battery supply voltage input.

12. A circuit according to claim 1 further comprising an input regulator coupled between the first non-battery input and the first power supply bus.

13. A circuit according to claim 1 further comprising a charging circuit for charging the battery supply and coupled between the non-battery and battery voltage supplies.

14. A portable battery powered device comprising a power supply circuit according to claim 1.

15. A multiple input regulator adapted for providing a regulated power supply to a portable battery powered device, the regulator having: regulator circuitry for regulating an input power supply from one of two or more power supply buses; a corresponding number of input MOS-based transistors pass devices each connected directly to a respective power supply bus; and switching means independently for switching the pass devices in and out of the regulation circuitry in order to derive the power supply for regulation from the respective power supply buses.

16. A regulator according to claim 15 wherein the regulator circuitry is linear regulator circuitry.

17. A regulator according to claim 15 wherein the regulator circuitry is switched regulator circuitry.

18. A multiple input regulator for providing a regulated power supply to a portable battery powered device, the regulator having: boost regulator circuitry comprising an input inductor and for regulating an input power supply from one of two or more power supply buses; and a plurality of input MOS-based transistor pass devices each connected directly to a respective power supply bus, the regulator arranged such that the input pass devices are coupled to the input inductor and independently switched in order to derive the power supply for regulation from the respective power supply buses.

19. An input regulator according to claim 15 wherein the regulator is adapted to provide one or more regulated 5V supplies.

20. An input regulator according to claim 18 wherein the regulator is adapted to provide one or more regulated 5V supplies.

21. The portable power supply circuit according to claim 1, wherein the common regulator is configured to independently control said pass devices, via different respective control signals, to selectively derive the regulated power supply.

22. The multiple input regulator according to claim 15, wherein the regulator is configured to independently control said pass devices, via different respective control signals, to selectively derive the regulated power supply.

23. The multiple input regulator according to claim 18, wherein the regulator is configured to independently control said pass devices, via different respective control signals, to selectively derive the regulated power supply.

* * * * *